US011240658B2

(12) United States Patent
Bertz et al.

(10) Patent No.: US 11,240,658 B2
(45) Date of Patent: Feb. 1, 2022

(54) CONTENT-DELIVERY FOOTPRINT AND CAPABILITIES DATA TRANSFER FROM WIRELESS COMMUNICATION DEVICES

(71) Applicant: T-Mobile Innovations LLC, Overland Park, KS (US)

(72) Inventors: Lyle T. Bertz, Lee's Summit, MO (US); Charles Brent Hirschman, Overland Park, KS (US); Lyle Walter Paczkowski, Mission Hills, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 160 days.

(21) Appl. No.: 16/225,682

(22) Filed: Dec. 19, 2018

(65) Prior Publication Data

US 2019/0124497 A1 Apr. 25, 2019

Related U.S. Application Data

(63) Continuation of application No. 14/504,804, filed on Oct. 2, 2014, now Pat. No. 10,200,856.

(51) Int. Cl.
*H04W 8/24* (2009.01)
*H04L 29/08* (2006.01)
(Continued)

(52) U.S. Cl.
CPC ......... *H04W 8/245* (2013.01); *H04L 65/4076* (2013.01); *H04L 65/4084* (2013.01);
(Continued)

(58) Field of Classification Search
None
See application file for complete search history.

(56) References Cited

U.S. PATENT DOCUMENTS 6,822,957 B1 11/2004 Schuster et al.
8,010,626 B2 8/2011 Yue et al.
(Continued)

FOREIGN PATENT DOCUMENTS

CN 101674288 3/2010
EP 2012501 1/2009
(Continued)

OTHER PUBLICATIONS

"3rd Generation Partnership Project; Technical Specification Group Services and System Aspects; Multimedia Broadcast/Multicast Service (MBMS); Protocols and codecs (Release 12)" 3GPP Standard; 3GPP TS 26.346, Generation Partnership Project (3GPP), Mobile Competence Centre; 650, Route Des Lucioles; F-06921 Sophia-Antipolis Cedex; France, vol. SA WG4, No. V12.3.0, Sep. 18, 2014 (Sep. 18, 2014), pp. 1-201, XP050925714, [retrieved on Sep. 18, 2014].

(Continued)

*Primary Examiner* — Kevin T Bates
*Assistant Examiner* — Dae Kim

(57) ABSTRACT

A wireless communication device generates content-delivery data indicating stored media content, content-delivery interface capability, tethered media devices, and Internet Protocol (IP) address data for the wireless communication device and for the tethered media devices. The wireless communication device wirelessly transfers the content-delivery data to a wireless communication network for delivery to a content distribution network. The wireless communication device transfers at least a portion of the stored media content to the wireless communication network for subsequent content delivery.

20 Claims, 6 Drawing Sheets

(51) Int. Cl.
  *H04W 4/18* (2009.01)
  *H04L 29/06* (2006.01)
(52) U.S. Cl.
  CPC .......... *H04L 65/60* (2013.01); *H04L 67/2814* (2013.01); *H04L 67/327* (2013.01); *H04W 4/18* (2013.01)

(56) References Cited

U.S. PATENT DOCUMENTS

| | | | |
|---|---|---|---|
| 8,112,531 B2 | 2/2012 | Walsh et al. | |
| 8,509,241 B2 | 8/2013 | Li et al. | |
| 8,576,846 B2 | 11/2013 | Kumar et al. | |
| 8,665,873 B2 | 3/2014 | Sarikaya et al. | |
| 8,761,056 B2 | 6/2014 | Hyun et al. | |
| 2009/0282127 A1* | 11/2009 | Leblanc | H04L 47/828 709/219 |
| 2010/0130122 A1 | 5/2010 | Sridhar et al. | |
| 2012/0005372 A1 | 1/2012 | Sarikaya et al. | |
| 2012/0226770 A1 | 9/2012 | Schapira et al. | |
| 2012/0239785 A1 | 9/2012 | Pazos | |
| 2013/0036234 A1* | 2/2013 | Pazos | H04L 65/00 709/231 |
| 2013/0094445 A1* | 4/2013 | De Foy | H04L 45/021 370/328 |
| 2013/0103819 A1 | 4/2013 | Meyer et al. | |
| 2013/0194999 A1 | 8/2013 | Anchan | |
| 2014/0052824 A1 | 2/2014 | Fall | |
| 2014/0192697 A1 | 7/2014 | Anchan et al. | |
| 2015/0026352 A1* | 1/2015 | De Foy | H04L 67/141 709/228 |
| 2015/0264408 A1* | 9/2015 | Hao | H04N 21/4334 725/23 |

FOREIGN PATENT DOCUMENTS

| | | |
|---|---|---|
| EP | 2716011 | 12/2012 |
| WO | 2012167106 | 12/2012 |
| WO | 2013120356 | 8/2013 |

OTHER PUBLICATIONS

Seedorf, J. et al., "CDNI Request Routing: Footprint and Capabilities Semantics; draft-ietf-cdni-footprint-capabilities-semantics-03.txt", Internet Engineering Task Force, IETF; Standardworkingdraft, Internet Society (ISOC) 4, Rue Des Falaises CH-1205 Geneva, Switzerland, Jul. 21, 2014 (Jul. 21, 2014), pp. 1-18, XP015100769, [retrieved on Jul. 21, 2014.].

Peterson, et al.; "Framework for Content Distribution Network Interconnection (CDNI)"; Internet Engineering Task Force (IETF); Aug. 2014; pp. 1-58; ISSN: 2070-1721; IETF.

Niven-Jenkins, et al.; "CDN Interconnection Metadata"; Network Working Group; Jul. 2, 2014; pp. 1-47; Internet Draft; IETF.

* cited by examiner

CONTENT-DELIVERY FOOTPRINT AND CAPABILITIES DATA TRANSFER FROM WIRELESS COMMUNICATION DEVICES

CROSS REFERENCE TO RELATED APPLICATIONS

This application is a continuation of, and claims the benefit of priority to, U.S. patent application Ser. No. 14/504,804, entitled "CONTENT-DELIVERY FOOTPRINT AND CAPABILITIES DATA TRANSFER FROM WIRELESS COMMUNICATION DEVICES," filed on Oct. 2, 2014, and which is hereby incorporated by reference in its entirety.

TECHNICAL BACKGROUND

Content Delivery Networks (CDNs) transfer media content, such as video, audio, graphics, and data objects for delivery to various end-user devices. In many content-delivery architectures, two CDNs are used—one for the content source and another for the content destination. These two CDNs exchange data to dynamically distribute media content from source to destination. The data interactions between CDNs are directed by Content Delivery Network Interface (CDNI) standards. CDNI specifies operations like control, logging, prepositioning, inventory, and footprint discovery. The footprint discovery uses Footprint and Capabilities Interface (FCI) data that describes the IP address ranges served by the CDNs.

Some content delivery systems use File Delivery over Unidirectional Transport (FLUTE) to multicast data objects. In a FLUTE system, a content source transmits data objects to a channel associated with a Uniform Resource Indicator (URI) and a Transport Object Identifier (TOI). An end-user joins a desired FLUTE channel to receive a multicast of the desired data objects. The FLUTE content source also provides File Description Tables (FDTs) that list the URIs and TOIs for the various data objects. The FDTs also identify error correction data, file sizes, coding types, aggregate data rates, and the like.

Some content delivery systems use wireless communication networks to deliver media content to televisions, computers, and phones. Many of the wireless networks have enhanced Multimedia Broadcast Multicast Service (eM-BMS) systems to wirelessly multicast high-consumption media content. The content delivery systems may use the wireless network eMBMS systems to deliver their media content. Unfortunately, wireless communication devices do not generate and transfer FCI data in an efficient and effective manner in wireless networking environments.

TECHNICAL OVERVIEW

A wireless communication device generates content-delivery data indicating stored media content, content-delivery interface capability, tethered media devices, and Internet Protocol (IP) address data for itself and the tethered media devices. The wireless communication device wirelessly transfers the content-delivery data to a wireless communication network for delivery to a content distribution network. The wireless communication device transfers at least a portion of the stored media content to the wireless communication network for subsequent content delivery.

DETAILED DESCRIPTION

Figure 1:
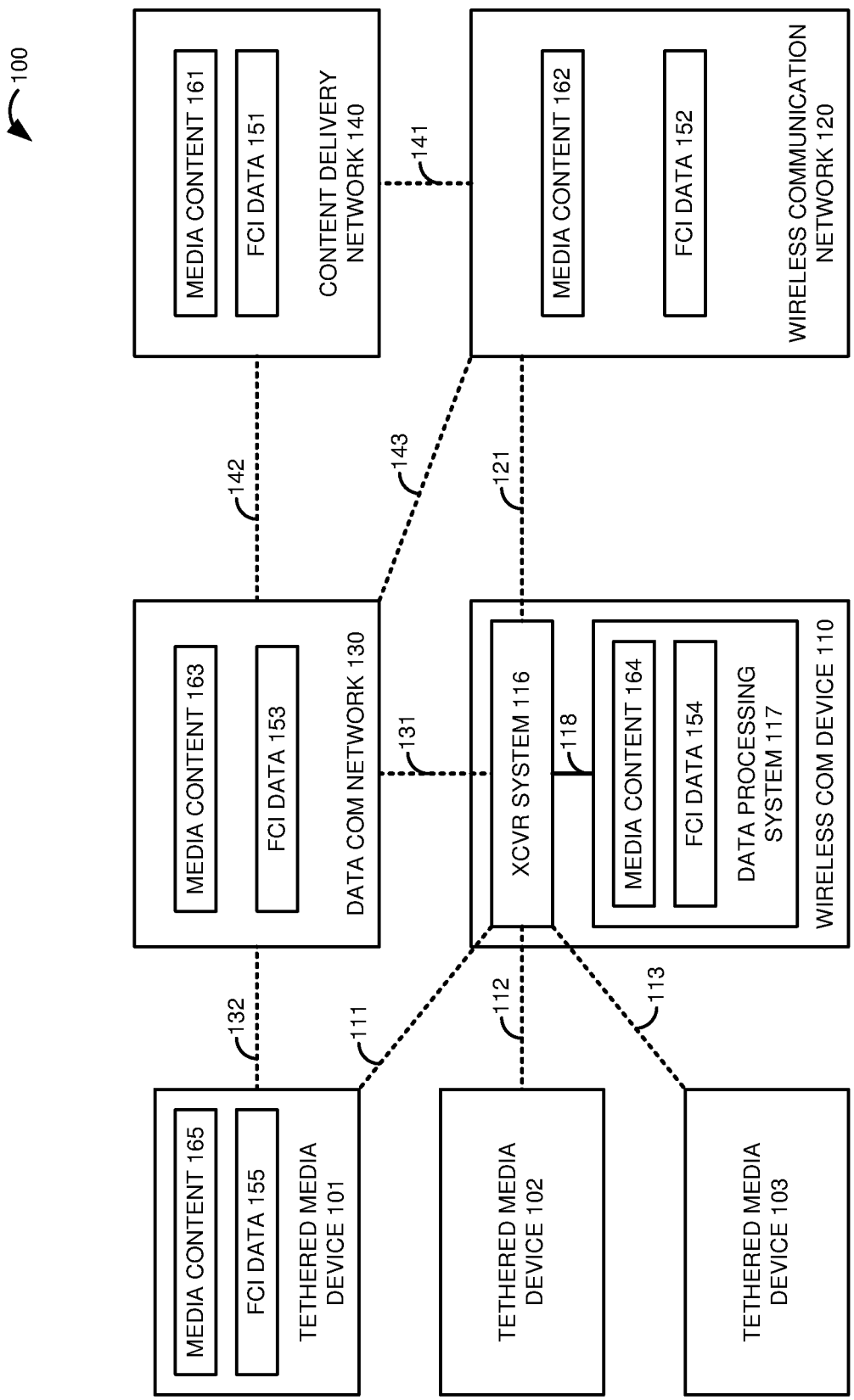
FIGS. 1-4 illustrate a communication network to generate and transfer content-delivery data from a wireless communication device.

FIG. 1-4 illustrate communication network 100 to generate and transfer content-delivery data from wireless communication device 110. Referring to FIG. 1, communication network 100 comprises tethered media devices 101-103, wireless communication device 110, wireless communication network 120, data communication network 130, and content delivery network 140. Wireless communication device 110 includes communication transceiver (XCVR) system 116 and data processing system 117. XCVR system 116 and data processing system 117 are coupled over bus interface 118.

Wireless communication device 110 comprises a phone, computer, media player, or some other apparatus having radio and data capability. XCVR system 116 comprises antennas, ports, signal processing circuitry, memory, software, and/or some other communication components. Data processing system 117 comprises data processing circuitry, memory, software, communication interfaces, and/or some other computer components. Bus interface 118 comprises communication circuitry, memory devices, software, and/or some other interface components.

Tethered media devices 101-103 comprise phones, computers, media players, televisions, audio systems, and the like. Wireless communication network 120 comprises wireless base stations, routers, gateways, media controllers and databases, mobility management systems, multicast coordination systems, and/or some other communication network elements. Data communication network 130 comprises hotspots, modems, routers, gateways, communication controllers and databases, and/or some other communication network elements. Content data network 140 comprises media servers, databases, media controllers, and/or some other media distribution systems. Note that portions of wireless communication network 120 and data communication network 130 may reside on-site with wireless communication device 110 and/or media devices 101-103.

XCVR system 116 and media devices 101-103 communicate over respective communication links 111-113. XCVR system 116 and wireless communication network 120 communicate over communication link 121. XCVR system 116 and data communication network 130 communicate over communication link 131. Tethered media device 101 and data communication network 130 communicate over communication link 132. Content delivery network 140 and wireless communication network 120 communicate over communication link 141. Content delivery network 140 and data communication network 130 communicate over communication link 142. Wireless communication network 120 and data communication network 130 communicate over communication link 143.

Communication links 111-113 and 131-132 use Wireless Fidelity (Wifi), Bluetooth, Universal Serial Bus (USB), Ethernet, Data Over Cable System Interface Specification (DOCSIS), Long Term Evolution (LTE), Internet Protocol (IP), and/or some other data communication protocol—including combinations thereof. Communication link 121 uses Wifi, wireless Ethernet, LTE, wireless IP, and/or some other wireless communication protocol—including combinations thereof. Communication links 141-143 use Time Division Multiplex (TDM), Ethernet, IP, Content Delivery Network Interface (CDNI) signaling, and/or some other communication protocol—including combinations thereof. Communication links 111-113, 121, 131-132, and 141-143 may be direct or may comprise various intermediate devices, systems, and networks.

Communication network 100 hosts media content 161-165. Media content 161-165 comprises video, audio, graphics, data files, data objects, and/or some other block of data. For example, media content 165 in media device 101 might be a few songs and pictures while media content 161 in content delivery network 140 might be a large movie and music library. Content delivery network 140 stores media content 161. Wireless communication network 120 stores media content 162. Data communication network 130 stores media content 163. Wireless communication device 110 stores media content 164. Tethered media device 101 stores media content 165.

Communication network 100 also exchanges CDNI Footprint and Capabilities Interface (FCI) data 151-155. FCI data 151-155 comprises IP address data, CDNI capabilities, and other information. FCI data 154 in wireless communication device 110 also comprises an inventory of stored media content, associated content metadata, and tethering data related to tethered media devices 101-103. Content delivery network stores FCI data 151. Wireless communication network 120 stores FCI data 152. Data communication network 130 stores FCI data 153. Wireless communication device 110 stores FCI data 154. Tethered media device 101 stores FCI data 155.

Wireless communication device 110 generates FCI data 154. FCI data 154 indicates stored media content 164 and associated content metadata. FCI data 154 indicates IP address data for wireless communication device 110. For example, FCI data 154 may indicate IP address allocations and translations used for device 110 by wireless communication network 120 and/or data communication network 130. FCI data 154 indicates CDNI capabilities for wireless communication device 110. For example, FCI data 154 may indicate if wireless communication device 110 can perform CDNI request routing and/or control triggering. 151-155.

FCI data 154 indicates tethered media devices 101-103 and IP address data for tethered media devices 101-103. For example, FCI data 154 may indicate IP address allocations and translations used for device 101 by wireless communication device 110, wireless communication network 120, and/or data communication network 130.

FCI data 154 may include additional pertinent information. In some examples, FCI data 154 may indicate CDNI Uniform Resource Identifier (URI) pattern matching data for device 110 and/or its local content-delivery network. FCI data 154 may indicate a stale date/time when media content 164 might be purged. FCI data 154 may indicate ownership verification data and date/time for media content 164. FCI data 154 may also indicate tether connection types for the tethered media devices 101-103, such as Wifi, USB, Ethernet, Bluetooth, and the like. Note that FCI data 154 may not indicate all of the media content, IP address data, tethered devices, and capabilities for wireless communication device 110.

Tethered media device 101 generates FCI data 155. FCI data 155 indicates stored media content 165 and associated content metadata. FCI data 155 may include IP address data from wireless communication device 110. For example, FCI data 155 may indicate IP address allocations and translations used for media device 101 by wireless communication device 110, wireless communication network 120, and/or data communication network 130. FCI data 155 may indicate CDNI capabilities for tethered media device 101. For example, FCI data 155 may indicate if wireless communication device 101 can perform CDNI request routing and/or control triggering. FCI data 155 may include additional pertinent information, such as CDNI URI pattern matching data for device 101, a stale date/time for media content 155, and ownership verification data and date/time for media content 155.

Media device 101 transfers FCI data 155 to wireless communication device 110—possibly responsive to tether connection set-up. Wireless communication device 110 may supplement FCI 155 with pertinent data, such as the IP address allocations and translations for media device 101, URI pattern matching data, ownership verification data, and the like. Wireless communication device 110 wirelessly transfers FCI data 154-155 to wireless communication network 120 for delivery to content distribution network 140. For example, wireless communication device 110 may transfer FCI data 154-155 to wireless communication network 120 during enhanced Multimedia Broadcast Multicast Service (eMBMS) registration. Wireless communication device 110 may alternatively transfer FCI data 154-155 to data communication network 130 for delivery to wireless communication network 120 or content distribution network 140.

Wireless communication device 110 wirelessly transfers media content 164 to wireless communication network 120. Wireless communication network 120 may host media content 164 and/or transfer media content 164 to data communication network 130 or content distribution network 140 for hosting/delivery. Wireless communication device 110 may also host some of media content 164 for tethered media devices 101-103.

Tethered media device 101 transfers media content 165 to wireless communication device 110. Wireless communication device 110 may host media content 165 and/or transfer media content 165 to wireless communication network 120, data communication network 130, and/or content distribution network 140 for hosting/delivery. Tethered media device 101 may alternatively transfer media content 165 to data communication network 130. Data communication network 130 may host media content 165 and/or transfer media content 165 to wireless communication network 120 or content distribution network 140 for hosting/delivery.

Advantageously, communication network 100 has several media content hosting options in multiple communication devices and networks. Communication network 100 has media content sourcing options from multiple communication devices and networks. In scenarios where the networks 120, 130, 140 and devices 110 and 101-103 lose synchronization, communication network 100 allows for rapid recovery with efficient and automatic FCI data transfers. For example, if wireless communication device 110 and content distribution network 120 lose data synchronization, communication network 100 offers an efficient technique to automatically recover and rebuild FCI data 154 and 151 as well as media content 164 and 161.

Figure 2:
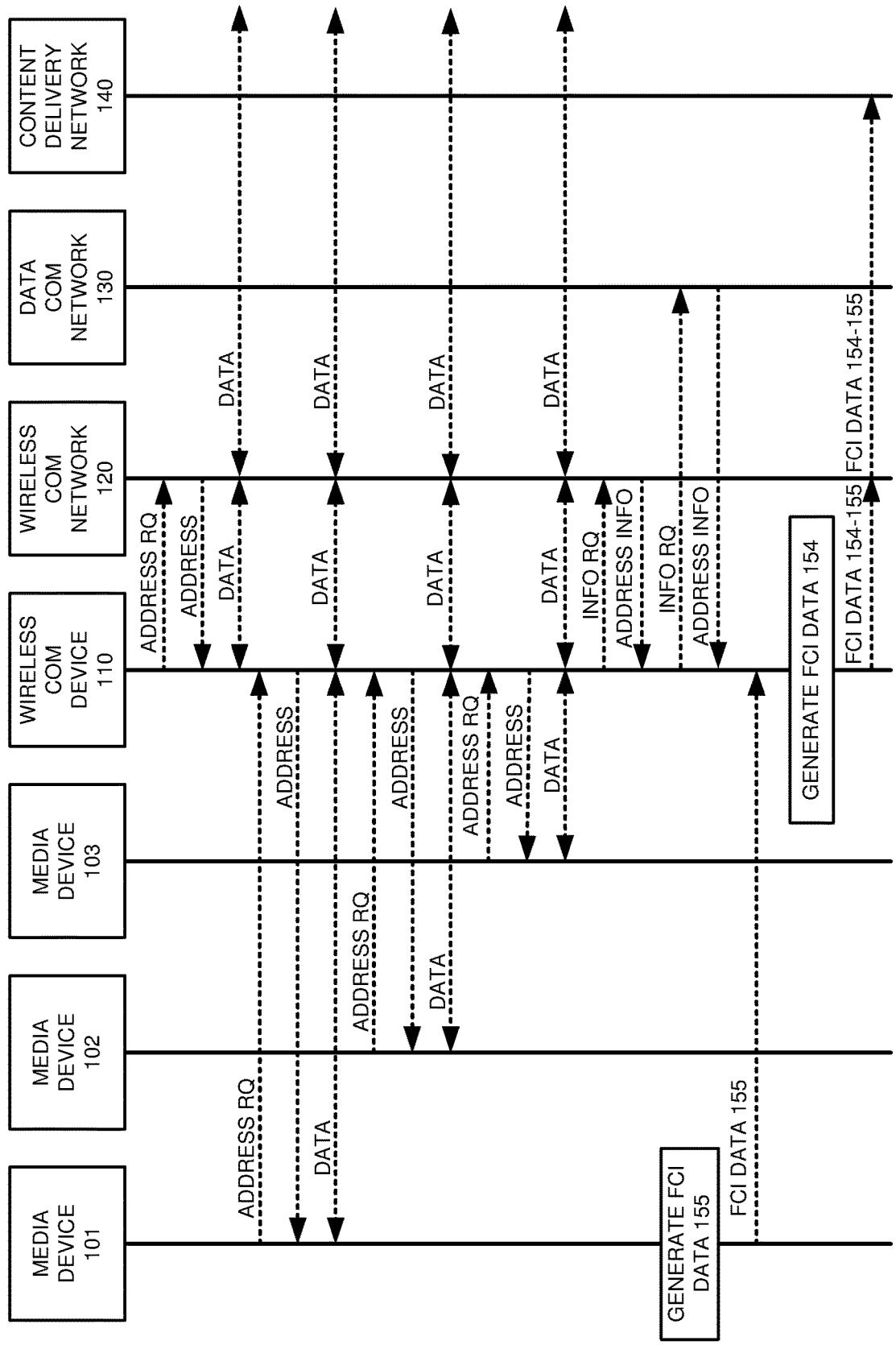

FIG. 2 illustrates an exemplary operation of wireless communication device 110 within this networking environment. Initially, wireless communication device 110 requests an IP address from wireless communication network 120. For example, device 110 may perform radio attachment to an LTE eNodeB and receive an IP address for use over a default bearer. Wireless communication network 120 allocates and distributes an IP address to wireless communication device 110. Wireless communication device 110 then exchanges data with external systems over wireless communication network 120. To support this data exchange, wireless communication network 120 translates between internal/external IP addresses for device 110.

Media device 101 requests an IP address from wireless communication device 110. For example, device 101 may be perform radio attachment to a Wifi interface in wireless communication device 110 and receive an IP address for use over the wifi link. Wireless communication device 110 allocates and distributes an IP address to media device 101. Media device 101 then exchanges data with external systems over wireless communication device 110 and wireless communication network 120. To support this data exchange, wireless communication device 110 and wireless communication network 120 translate between IP addresses for device 101.

Media device 102 requests an IP address from wireless communication device 110. For example, device 102 may have a USB attachment to a USB port on wireless communication device 110 and receive an IP address for use over the USB link. Wireless communication device 110 allocates and distributes an IP address to media device 102. Media device 102 then exchanges data with external systems over wireless communication device 110 and wireless communication network 120. To support this data exchange, wireless communication device 110 and wireless communication network 120 translate between IP addresses for device 102.

Media device 103 also requests an IP address from wireless communication device 110. For example, device 103 may have an Ethernet radio attachment to an Ethernet interface in wireless communication device 110 and receive an IP address for use over the Ethernet link. Wireless communication device 110 allocates and distributes an IP address to media device 103. Media device 103 then exchanges data with external systems over wireless communication device 110 and wireless communication network 120. To support this data exchange, wireless communication device 110 and wireless communication network 120 translate between IP addresses for device 103.

Wireless communication device 110 transfers an information request for its IP addressing data to wireless communication network 120. Wireless communication network 120 returns the pertinent IP address data to wireless communication device 110. For example, wireless communication device 110 may transfer a Port Control Protocol message to wireless communication network 120 that requests the IP address allocation protocol and the IP address translation prefix(es) for device 110. In some examples, wireless communication device 110 acquires pertinent IP address data on behalf of tethered devices 101-103 in a similar manner.

Wireless communication device 110 transfers an information request for its IP addressing information to data communication network 130. Data communication network 130 returns the pertinent IP address data to wireless communication device 110. For example, wireless communication device 110 may transfer a Port Control Protocol message to data communication network 130 that requests the IP address allocation protocol and the IP address translation prefix(es) for device 110.

Media device 101 generates FCI data 155. FCI data 155 indicates stored media content 165 and other data as described herein. Media device 101 transfers FCI data 155 to wireless communication device 110—perhaps in response to tether attachment, on-demand, or based on a schedule. Wireless communication device 110 may supplement FCI data 155 with more data, such as IP address allocation and translation data.

Wireless communication device 110 generates FCI data 154. FCI data 154 indicates stored media content 164 and IP address data for wireless communication device 110. For example, FCI data 154 may indicate IP address allocations and translations used for device 110 by wireless communication network 120 and/or data communication network 130. FCI data 154 indicates CDNI capabilities for wireless communication device 101. FCI data 154 indicates tethered media devices 101-103 and IP address data for tethered media devices 101-103. For example, FCI data 154 may indicate IP address allocations and translations for device 101.

In some examples, FCI data 154-155 indicates URI pattern matching data for devices 101 and 110 or their local content-delivery networks. FCI data 154-155 may indicate a stale date/time when media content 164-165 might be purged. FCI data 154-155 may indicate ownership verification data and date/time for media content 164-165. FCI data 154-155 may also indicate other content-delivery metrics for content 164-165 including: uniform resource indicators, content collection identifiers, server methods, number of requesting IP endpoints, number of requests per content version, total bytes in content responses (body, header, and status line), total bytes in content response bodies, total time taken to serve content, public uniform resource locators, originating uniform resource indicators before redirection, and originating uniform resource indicator pattern identifiers.

FCI data 154 may indicate additional tether metrics for wireless communication device 110 including: tether connection technology (Wifi P2P, Wifi hotspot, Wifi adhoc, Bluetooth, USB, LTE, and Ethernet), tether connection status, tether content distribution network status, tether content distribution network URI pattern. FCI data 154 may also indicate: if device 110 is CDNI capable, Access Point Names (APNs) for device 110, APN status, applications and MIME types supported by each host in device 110, launch intent filters in device 110, if media content 164 was pre-positioned by content delivery network 140, media content 164 transfer date/time/protocol, media content 164 usage dates/times/protocols, and media content 164 byte range for partial content.

FCI data 155 may indicate additional tether metrics for media device 101 including: tether connection technology, tether connection status, tether content distribution network status, and tether content distribution network URI pattern. FCI data 155 may also indicate: if media device 101 is CDNI capable, APNs for media device 101, APN status, applications and MIME types supported by each host in device 101, launch intent filters in device 101, if media content 165 was pre-positioned by content delivery network 140, media content 165 transfer date/time/protocol, media content 165 usage dates/times/protocols, and media content 165 byte range for partial content.

In some examples, FCI data 154-155 may indicate File Delivery over Unidirectional Transport (FLUTE) information including File Description tables (FDTs). The FLUTE FDTs indicate URIs and Transport Object Identifiers (TOIs) for FLUTE media objects. The FDTs may identify error correction data, file sizes, coding types, aggregate data rates, and the like. The FDTs may identify real time transfer speeds, content-source priority ranks, content source resource ranks, and transfer rate suggestions and requirements.

Figure 3:
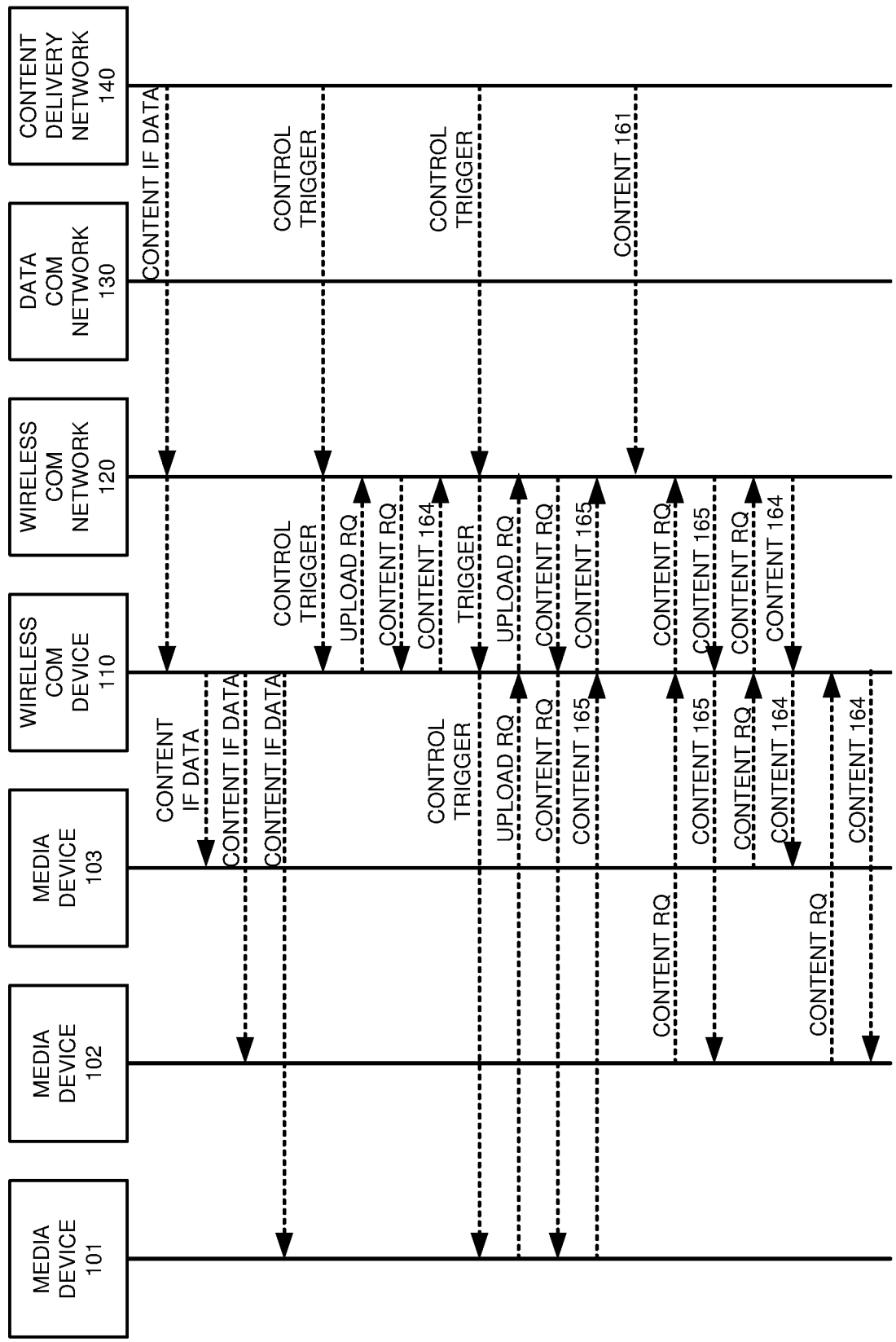

Referring to FIG. 3, content delivery network 140 transfers content interface data for media content 161-165 to wireless communication network 120. The content interface is developed by content delivery network 140 based in part on FCI data 151-155. Wireless communication network 120 transfers portions of the content interface data to wireless communication device 110, and device 110 forwards portions of the content interface data to tethered media devices 101-103.

Content delivery network 140 transfers a control trigger for media content 164 to wireless communication network 120 for delivery to wireless communication device 110. The control trigger is generated by content delivery network 140 based in part on FCI data 154 indicating the ability of wireless communication device 110 to handle control triggers from content delivery network 140. Responsive to the control trigger, wireless communication device 110 transfers media content 164 to wireless communication network 120 for hosting. This transfer is accomplished via an upload request from device 110 to network 120 followed by a content request from network 120 to device 110 and then content 164 transfer from device 110 to network 120. Alternatively, content delivery network 140 might have transferred a control trigger to wireless communication device 110 to host media content 164 itself or transfer media content 164 somewhere else for hosting, such as data communication network 130 or one of media devices 101-103.

Content delivery network 140 transfers a control trigger for media content 165 to wireless communication network 120 for delivery to media device 101 through wireless communication device 110. The control trigger is generated by content delivery network 140 based in part on FCI data 155 indicating the ability of media device 101 to handle control triggers from content delivery network 140. Responsive to the control trigger, media device 101 transfers media content 165 to wireless communication network 120 for hosting. This transfer is accomplished via an upload request from media device 101 to network 120 followed by a content request from network 120 to media device 101 and then content 165 transfer from device 101 to network 120 (through wireless communication device 110). Alternatively, content delivery network 140 might have transferred a control trigger to media device 110 to host media content 165 itself or transfer media content 164 somewhere else for hosting, such as wireless communication device 110 or data communication network 130.

Content delivery network 140 transfers media content 161 to wireless communication network 120 (and typically data communication network 130) for hosting. Responsive to the content interface data, the user of media device 102 requests media content 165 from wireless communication network 120 through wireless communication device 110. Responsive to the request, wireless communication network 120 transfers media content 165 through wireless communication device 110 to media device 102.

Responsive to the content interface data, an application on media device 103 requests media content 164 from wireless communication network 120 through wireless communication device 110. Responsive to the request, wireless communication network 120 transfers media content 164 through wireless communication device 110 to media device 103. In an alternative arrangement, wireless communication device 110 may host media content 164 as directed by a control trigger. In this alternative, media device 102 requests media content 164 from wireless communication device 110, and responsive to the request, wireless communication device 110 transfers media content 164 to media device 102.

Figure 4:
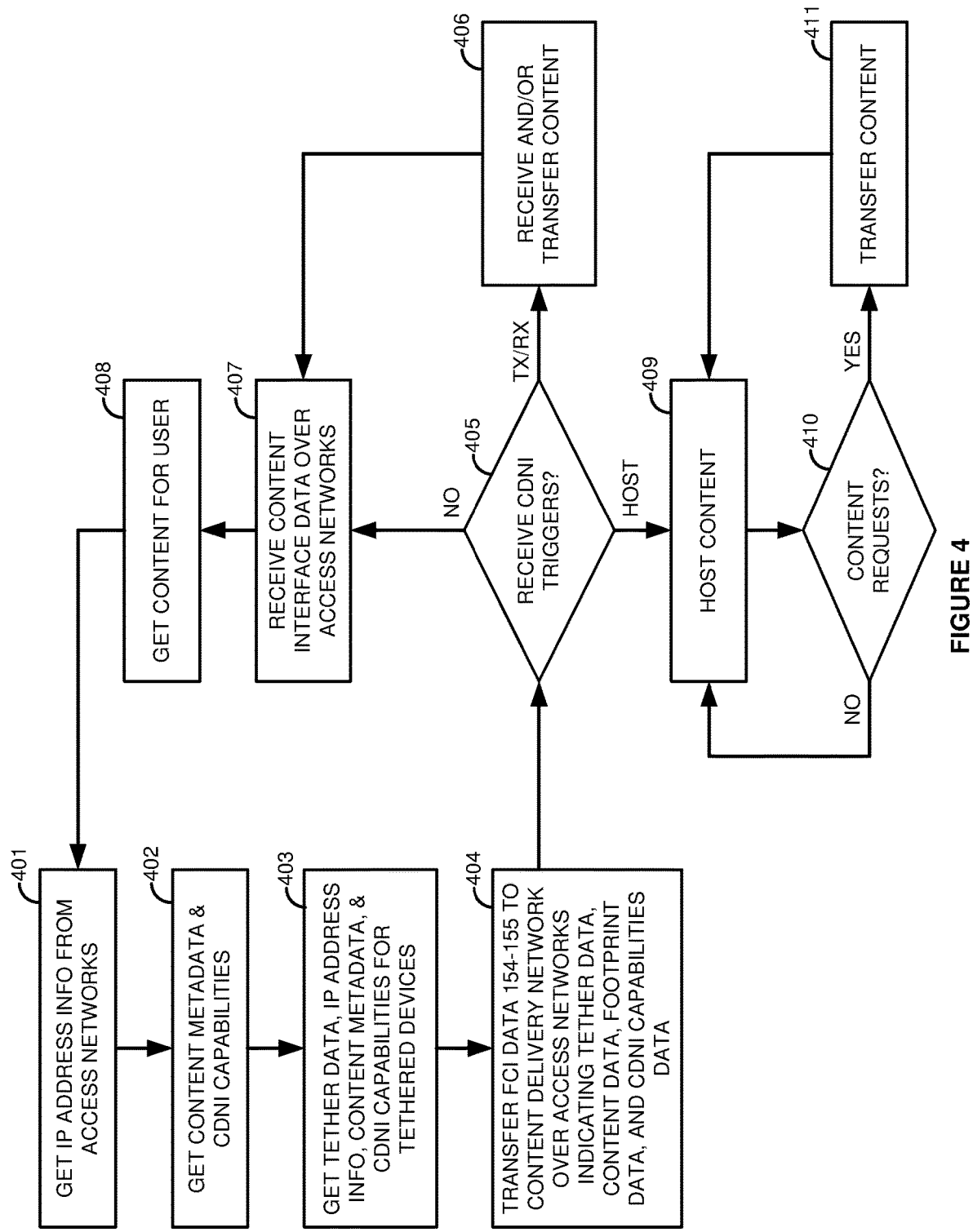

FIG. 4 illustrates an exemplary operation of wireless communication device 110 to transfer FCI data 154-155 and handle CDNI control triggers. Wireless communication device 110 gets IP address information from access networks, such as networks 120 and 130 (401). The Port Control Protocol may be adapted to discover upstream network address translations, prefixes, allocation protocols, and the like. For example, device 110 may adapt Port Control Protocol messaging to discover its IP address allocation protocol and criteria. Allocation protocols include IPv6 Mobility, IPv4 Mobility, DHCP, and others. Allocation criteria includes domain names, APNs, device identifiers, user identifiers, and the like.

Wireless communication device 110 may use Port Control Protocol messaging to discover its IP address translations. The address translations convert between internal/external IP addresses and/or IP protocol versions. Wireless communication device 110 may adapt Port Control Protocol messaging to request and receive updates to this IP address information from the access networks.

Wireless communication device 110 gets its content metadata and CDNI capabilities (402). The content metadata indicates stored media content 164 (and perhaps other content). The content metadata indicates if content 164 is merely cached or if it has been pre-positioned. The content metadata indicates a stale date/time when media content 164 may no longer be hosted. The content metadata indicates ownership verification data and date/time for media content 164. For example, the content metadata may specify the most recent ownership verification for media content 164 by date, time, authenticating system, authentication code, and the like. The CDNI capabilities may indicate if device 110 can handle CDNI interaction and if device 110 is currently CDNI active. The CDNI capabilities may indicate if device 110 can handle request routing, control triggering, content transfer, content forwarding, and/or content hosting. The CDNI capabilities may indicate URI pattern matching data for device 110 and/or its associated content-delivery networks.

Wireless communication device 110 gets its tethering data, IP address information, content metadata, and CDNI capabilities for tethered devices (203). Some of this information could be pushed or pulled from devices 101-103 upon tethering. The tethering data includes a list of tethered devices and may indicate connection types, such as Wifi, USB, Ethernet, Bluetooth, and the like. Wireless communication device 110 may collect IP address information for media devices 101-103. For example, wireless communication device 110 may obtain its internal address allocation and translation data for media device 101, as well as, the allocation and translation data from wireless communication network 120 and data communication network 130.

Wireless communication device 110 transfers FCI data 154-155 indicating tether data, content data, footprint data, and CDNI capabilities for delivery to content delivery network 140 over one or both of access networks 120 and 130 (404). Some of this FCI data may be filtered by device 110. For example, some of the tethered devices, media content, address information, and the like could remain hidden by device 110.

Wireless communication device 110 may receive CDNI control triggers from content delivery network 140 or another source (405). If the CDNI control trigger is to receive and/or transfer content (405), then wireless communication device 110 receives and/or transfers the content per the trigger (406). If no CDNI control trigger is received (405) or after the trigger is handled, then wireless communication device 110 receives content interface data over the access networks (407). Wireless communication device 110 receives media content for the user (408) and the process repeats. If the CDNI control trigger (405) is to host content (409), then wireless communication device 110 awaits content requests (410). If a content request is received, then wireless communication device 110 transfers the requested content (411).

Figure 5:
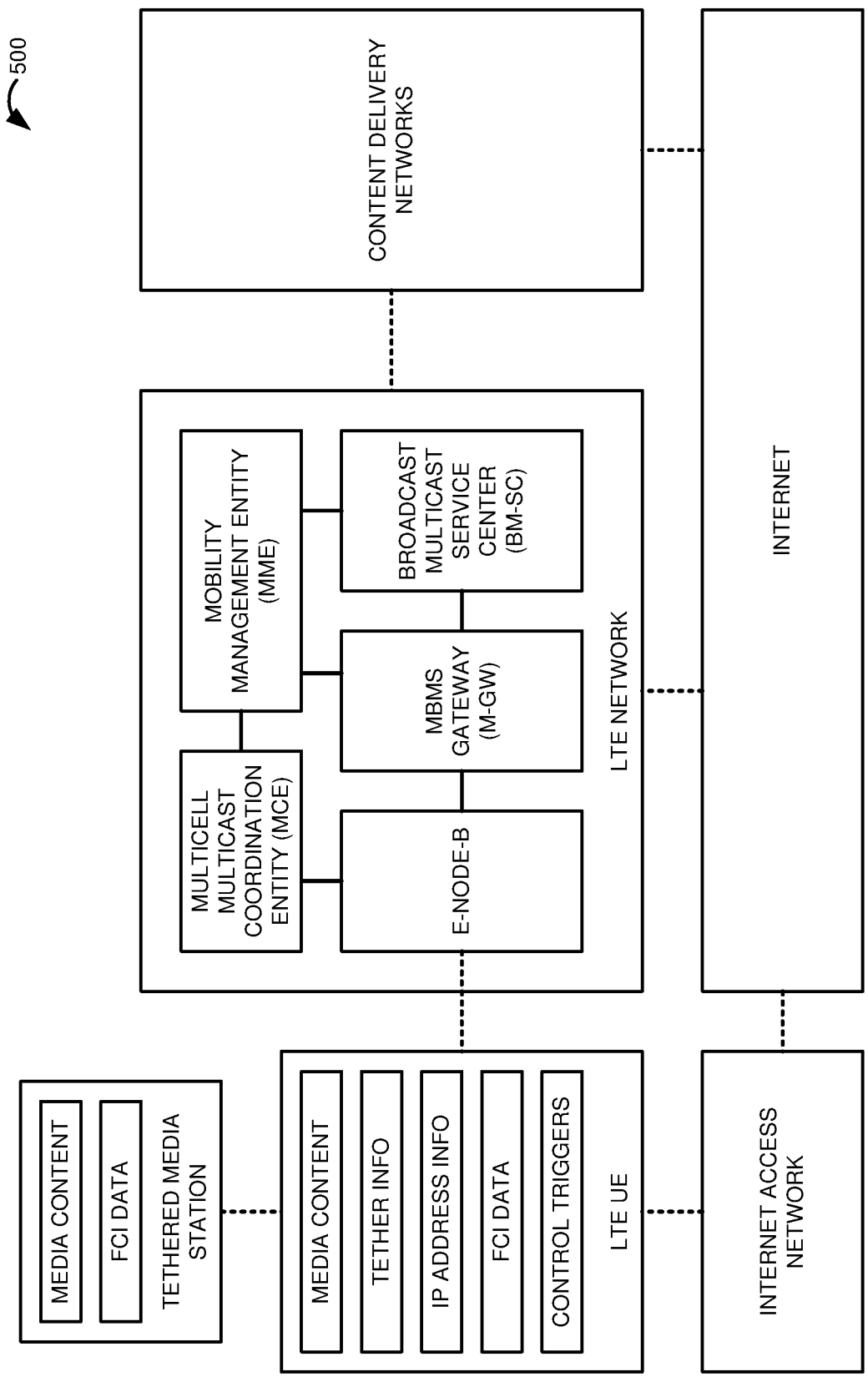
FIG. 5 illustrates a communication network to transfer FCI data generated by an LTE UE and a tethered media station.

FIG. 5 illustrates communication network 500 to transfer FCI data generated by LTE User Equipment (UE) and a tethered media station. Communication network 500 comprises the LTE UE, the LTE network, the tethered media station, Content Delivery Networks (CDNs), an Internet access network, and the Internet. The LTE network comprises an eNodeB, Multimedia Broadcast Multicast System (MBMS) Gateway (M-GW), Broadcast Multicast Service Center (BM-SC), Multicell Multicast Coordination Entity (MCE), Mobility Management Entity (MME), and various other network element that are restricted for clarity. The number of UEs, tethered systems, eNodeBs, MCEs, and the like has been restricted for clarity on FIG. 5.

Upon network attachment and periodically thereafter, the LTE UE transfers Domain Name System (DNS) Service (SRV) requests to the Internet access network and to the LTE network. These access networks return access data identifying Port Control Protocol (PCP) interfaces. The identified PCP interfaces are operationally coupled to the IP address allocation and translation systems that serve the LTE UE in the LTE network and in the Internet access network. The LTE UE transfers adapted PCP messages to these PCP interfaces to discover its IP translations and allocations used in the Internet access network and the LTE network. The LTE UE also transfers adapted PCP messages to these identified PCP interfaces to automatically acquire updates to their IP address information in the future.

Upon power-up and periodically thereafter, the LTE UE generates FCI data indicating its media content and associated metadata like stale time, ownership-verification information, and the like. The LTE UE also generates the FCI data indicating the IP address info, CDNI capabilities, and any tethering information. The IP address information indicates the IP translations and allocations used in the access networks. The FCI data indicates CDNI capabilities such as: CDNI capable, CDNI active, request-route abilities, control trigger abilities, or some other CDNI operation.

Upon wireless attachment and periodically thereafter (with updates or after de-registrations), the LTE UE performs an eMBMS registration with the BM-SC. The LTE UE transfers the FCI data to the BM-SC during eMBMS registration. The BM-SC forwards the FCI data to the appropriate CDNs for the LTE UE. Responsive to this FCI data transfer, the LTE UE may receive control triggers to receive, transfer, and/or host media content.

The LTE UE may receive control triggers from the CDNs to transfer a first portion of its media content to the LTE network. In response to one of these control triggers, the LTE UE transfers a request to the BM-SC to request the first portion of the media content from the LTE UE. The BM-SC responsively sends a request for the first portion of the media content to the LTE UE. The LTE UE then transfers the first portion of the media content to the BM-SC.

The LTE UE may receive control triggers from the CDNs to host a second portion of its media content over the LTE network and/or the Internet access network. In response to one of these control triggers, the LTE UE awaits content requests for the hosted media content and transfers any of the requested media content to the requesting systems in accord with the trigger.

The LTE UE offers other media devices with tethered data communications to the LTE network and/or the Internet access network. In this example, a media station having stored media content attaches to the LTE UE over Wifi, LTE, USB, Ethernet, or the like. The LTE UE allocates an IP address (perhaps its own IP address and range of IP port numbers) to the media station. The LTE UE exchanges data communications with the media station using this allocated IP address. The LTE UE exchanges these tethered data communications with the LTE or Internet-access network using its own IP address.

In response to tethering and periodically thereafter, the media station generates FCI data indicating its CDNI capabilities, stored media content, and associated content metadata like stale time, ownership-verification information, and the like. The media station transfers the FCI data to the LTE UE.

In response to the media-station FCI data, the LTE UE performs the PCP discovery process on itself to discover its internal IP address allocations and translations for the media station. The LTE UE supplements the media-station FCI data with its internal IP address data for the media station and its own IP address allocations and translations used in the Internet-access network and the LTE network. The LTE UE further supplements the media-station FCI data indicating tethering status and tether connection type, URI pattern matching data and identifiers, and other pertinent CDNI data.

The LTE UE transfers this media-station FCI data to the BM-SC during eMBMS registrations or periodic updates to the BM-SC. The BM-SC forwards the media-station FCI data to the appropriate CDNs for the media station. Responsive to this FCI data transfer, the LTE UE and/or the media station may receive control triggers.

The media station may receive control triggers from the CDNs to transfer a first portion of its media content to the LTE network. In response to one of these control triggers, the media station transfers a request to the BM-SC to request the first portion of the media content from the media station. The BM-SC responsively sends a request for the first portion of the media content to the media station. The media station transfers the first portion of the media content to the BM-SC.

The media station may receive control triggers from the CDNs to transfer a second portion of the media content to the LTE UE. In response to one of these control triggers, the media station transfers a request to the LTE UE to request the second portion of the media content from the media station. The LTE UE responsively sends a request for the second portion of the media content to the media station. The media station transfers the second portion of the media content to the LTE UE. The LTE UE may then host or transfer this content from the media station based on its own control triggers.

The media station may receive control triggers from the CDNs to host a third portion of its media content over the LTE UE. In response to one of these control triggers, the media station awaits content requests for the hosted media content and transfers any of the requested media content to the requesting systems over the LTE UE in accord with the trigger.

To make communication system 500 more efficient, the LTE UE may use the CDN footprint hostname of "localhost" to indicate that it is a CDNI capable system that can serve tethered devices. In addition, the LTE UE and the media station may use granular Content Collection Identifiers (CCIDs) to indicate cache applications, content, or purpose. For example, a CCID of "cache.browser.appZ" indicates the client application "Z" and the type of application—a browser. A CCID of "pre-position.recommendations.cdnX" indicates the purpose of content recommendations from CDN X.

To make communication system 500 more efficient, the LTE UE or the BM-SC may verify the ownership of media content in the UE or the media station. Ownership may be verified by matching URI patterns for the content and host with the URI patterns for the owning CDN. For media content, ownership verification data, usage logs, transfer logs, and access keys can be compared to known values and ranges to verify ownership.

Advantageously, the LTE UE provides robust FCI data to the CDNs upon attachment to the LTE network and periodically thereafter. The LTE UE can handle control triggers for media content transfer and hosting. Thus, the LTE UE provides the CDNs with various content sourcing and content hosting options. Since the LTE UE frequently performs this CDNI data processing, a loss of synchronization between the LTE UE and the CDNs is rapidly and automatically resolved.

Likewise, the tethered media device also provides robust FCI data to the CDNs upon attachment to the LTE UE and periodically thereafter. The tethered media device may handle control triggers for media content transfer and hosting. Thus, the tethered media device provides the CDNs with additional content sourcing and content hosting options. Since the tethered media device frequently performs this CDNI data processing, a loss of synchronization between the tethered media device and the CDNs is rapidly and automatically resolved.

Figure 6:
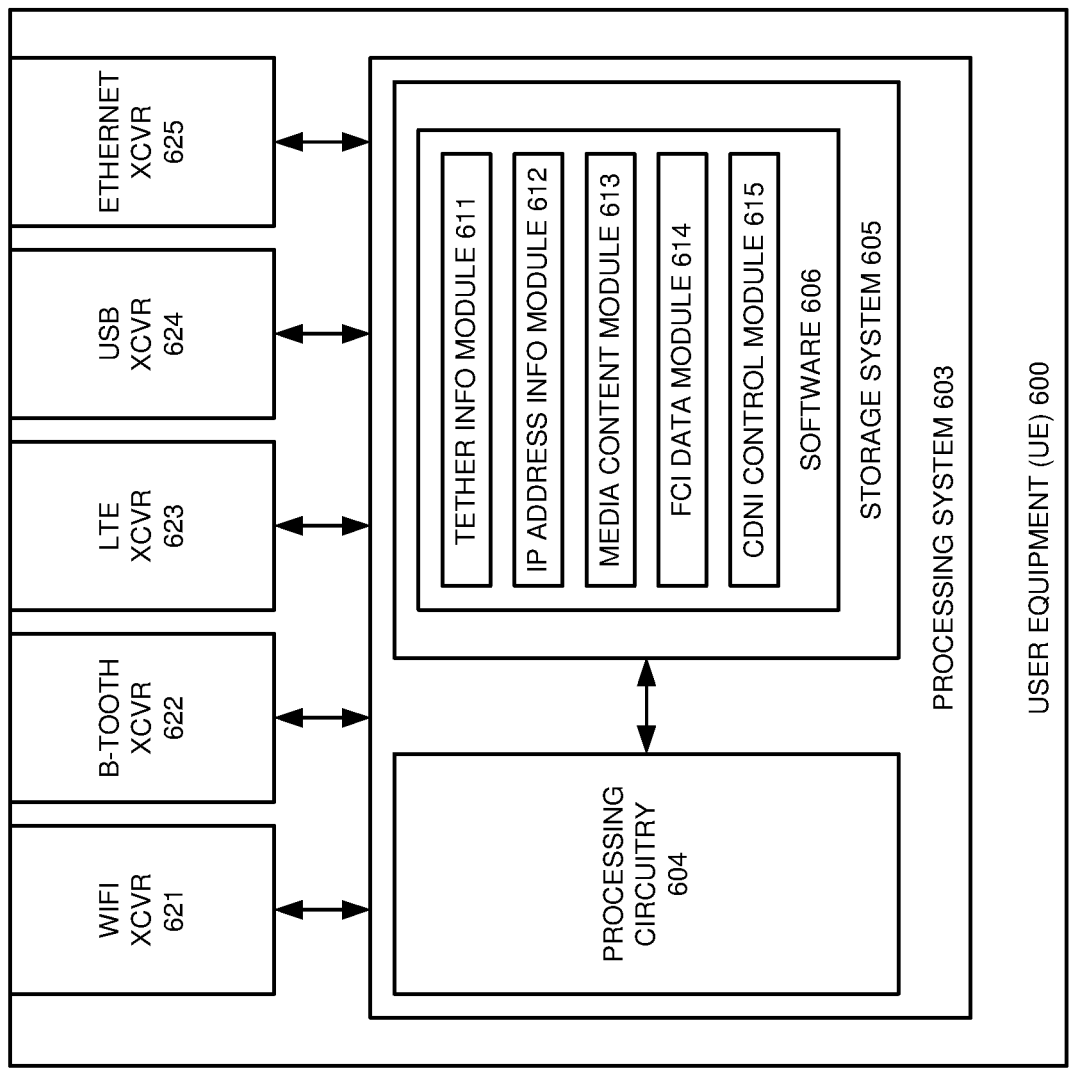
FIG. 6 illustrates an LTE UE to generate and transfer CDNI FCI data.

FIG. 6 illustrates LTE UE 600 to generate and transfer CDNI FCI data. UE 600 is an example of wireless communication devices 110 and the LTE UE of FIG. 5, although these devices may use alternative configurations and operations. UE 600 comprises Wifi transceiver 621, Bluetooth transceiver 622, LTE transceiver 623, Universal Serial Bus (USB) transceiver 624, and Ethernet transceiver 625. Communication transceivers 621-625 comprise communication components, such as antennas, ports, amplifiers, filters, modulators, signal processors, and the like.

Processing system 603 comprises processing circuitry 604 and storage system 605. Storage system 605 stores software 606. Software 606 includes software modules 611-615. Some conventional aspects of UE 600 are omitted for clarity, such as power supplies, enclosures, and the like. UE 600 may be centralized or distributed and may include various virtualized components.

In processing system 603, processing circuitry 604 comprises circuit boards, integrated circuitry, and associated electronics. Storage system 605 comprises non-transitory, machine-readable, data storage media, such as flash drives, disc drives, memory circuitry, servers, and the like. Software 606 comprises machine-readable instructions that control the operation of processing circuitry 604 when executed. Software 606 includes software modules 611-615 and may also include operating systems, applications, data structures, utilities, databases, and the like. All or portions of software 606 may be externally stored on one or more storage media, such as flash drives, discs, servers, and the like.

When executed by processing circuitry 604, tether information module 611 directs circuitry 604 to obtain, supplement, and report FCI data for tethered devices. When executed by processing circuitry 604, IP address information module 612 directs circuitry 604 to obtain IP address allocation and translation data from access networks. When executed by processing circuitry 604, media content information module 613 directs circuitry 604 to generate content metadata for stored media content and to supplement the content metadata for tethered devices. When executed by processing circuitry 604, FCI data module 614 directs circuitry 604 to obtain, supplement, and report its own FCI data. When executed by processing circuitry 604, control module 615 directs circuitry 604 to receive and process CDNI control triggers.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device to wirelessly distribute media content, the method comprising:
   in the wireless communication device, wireless transceiver circuitry wirelessly tethering media devices that store media content and wirelessly communicating with a wireless communication network;
   in the wireless communication device, data processing circuitry generating content-delivery data for the wireless communication device indicating the wirelessly-tethered media devices that are wirelessly-tethered to the wireless communication device, the stored media content stored in the wireless communication device and the wirelessly-tethered media devices, and Internet Protocol (IP) address data for the wireless communication device and for the wirelessly-tethered media devices;
   the wireless transceiver circuitry receiving second content-delivery data for at least one of the wirelessly-tethered media devices indicating the stored media content stored in the at least one of the wirelessly-tethered media devices and IP address allocations used for the at least one of the wirelessly-tethered media devices by the wireless communication network;
   in the wireless communication device, the wireless transceiver circuitry wirelessly transferring the content-delivery data and the second content-delivery data to the wireless communication network for delivery to a content distribution network; and
   in the wireless communication device, the wireless transceiver circuitry wirelessly transferring at least a portion of the stored media content to the wireless communication network for subsequent content delivery.

2. The method of claim 1 wherein generating the content-delivery data comprises generating an enhanced Multimedia Broadcast Multicast Service (eMBMS) registration having the content-delivery data for the wireless communication device.

3. The method of claim 1 wherein generating the content-delivery data comprises generating File Delivery over Unidirectional Transport (FLUTE) information including a File Description Table (FDT) for the wireless communication device.

4. The method of claim 1 wherein generating the content-delivery data indicating the content delivery interface capability comprises indicating a content-delivery redirection capability for the wireless communication device.

5. The method of claim 1 wherein generating the content-delivery data indicating the content delivery interface capability comprises indicating a content-delivery request-routing capability of the wireless communication device.

6. The method of claim 1 wherein generating the content-delivery data indicating the content delivery interface capability comprises indicating a content-delivery control triggering capability of the wireless communication device.

7. The method of claim 1 wherein generating the content-delivery data indicating the wirelessly-tethered media devices comprises indicating wireless-tether connection types for the wirelessly-tethered media devices.

8. The method of claim 1 wherein generating the content-delivery data indicating the IP address data for the wireless communication device comprises indicating IP address translations used by the wireless communication network for the wireless communication device.

9. The method of claim 1 wherein generating the content-delivery data indicating the IP address data for the wirelessly-tethered media devices comprises indicating IP address translations used by the wireless communication device for the wirelessly-tethered media devices.

10. The method of claim 1 further comprising transferring another portion of the stored media content to at least one of the wirelessly-tethered media devices.

11. A wireless communication device to wirelessly distribute media content comprising:
  wireless transceiver circuitry configured to wirelessly tether media devices that store media content and wirelessly communicate with a wireless communication network;
  data processing circuitry configured to generate the content-delivery data for the wireless communication device indicating stored media content, content-delivery interface capability indicating the wirelessly-tethered media devices, and Internet Protocol (IP) address data for the wireless communication device and for the wirelessly-tethered media devices;
  the wireless transceiver circuitry configured to receive second content-delivery data for at least one of the wirelessly-tethered media devices indicating the stored media content stored in the at least one of the wirelessly-tethered media devices and IP address allocations used for the at least one of the wirelessly-tethered media devices by the wireless communication network; and
  the wireless transceiver circuitry configured to wirelessly transfer the content delivery data and the second content-delivery data to the wireless communication network for delivery to a content distribution network and transfer at least a portion of the stored media content to the wireless communication network for subsequent content delivery.

12. The method of claim 1 wherein the data processing circuitry is configured to generate an enhanced Multimedia Broadcast Multicast Service (eMBMS) registration having the content-delivery data for the wireless communication device.

13. The wireless communication device of claim 11 wherein the data processing circuitry is configured to generate the content-delivery data to indicate File Delivery over Unidirectional Transport (FLUTE) information including a File Description Table (FDT) for the wireless communication device.

14. The wireless communication device of claim 11 wherein the data processing circuitry is configured to generate the content-delivery data to indicate a content-delivery redirection capability of the wireless communication device.

15. The wireless communication device of claim 11 wherein the data processing circuitry is configured to generate the content-delivery data to indicate a content-delivery request-routing capability of the wireless communication device.

16. The wireless communication device of claim 11 wherein the data processing circuitry is configured to generate the content-delivery data to indicate a content-delivery control triggering capability of the wireless communication device.

17. The wireless communication device of claim 11 wherein the data processing circuitry is configured to generate the content-delivery data to indicate wireless-tether connection types for the wirelessly-tethered media devices.

18. The wireless communication device of claim 11 wherein the data processing circuitry is configured to generate the content-delivery data to indicate IP address translations used by the wireless communication network for the wireless communication device.

19. The wireless communication device of claim 11 wherein the data processing circuitry is configured to generate the content-delivery data to indicate IP address translations used by the wireless communication device for the wirelessly-tethered media devices.

20. The wireless communication device of claim 11 wherein the wireless transceiver circuitry is configured to transfer another portion of the stored media content to at least one of the wirelessly-tethered media devices.

* * * * *